Nov. 17, 1936.  L. R. CHRISTIE  2,061,022
METHOD FOR THE TREATMENT OF INDUSTRIAL WASTE AND THE LIKE
Filed Sept. 29, 1934
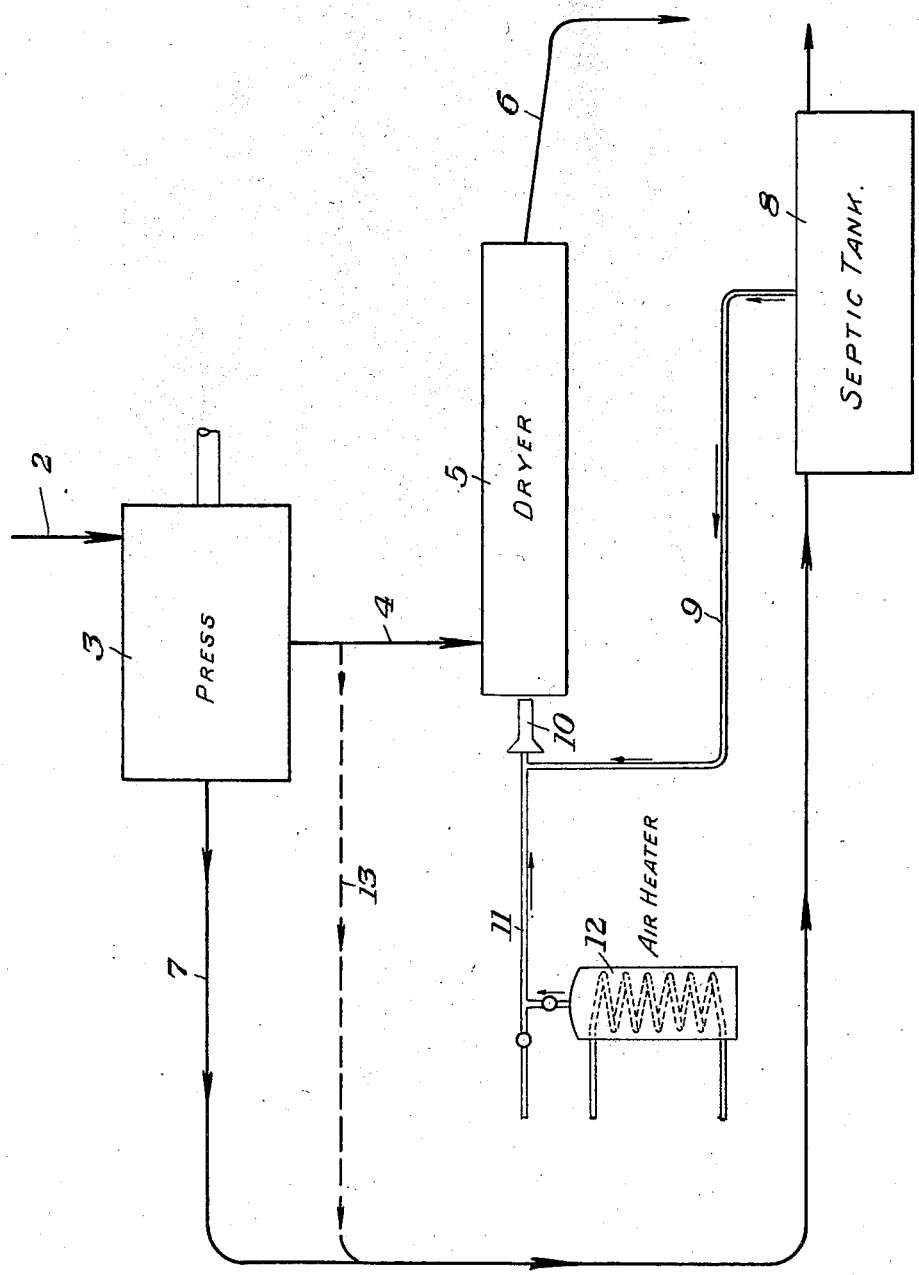
INVENTOR
Lindsay R. Christie
by his attorneys Patented Nov. 17, 1936

2,061,022

UNITED STATES PATENT OFFICE 2,061,022

METHOD FOR THE TREATMENT OF INDUSTRIAL WASTE AND THE LIKE

Lindsay R. Christie, Pittsburgh, Pa.

Application September 29, 1934, Serial No. 746,075

5 Claims. (Cl. 210—2)

This invention relates to the disposal of industrial wastes and is for an improved method and apparatus whereby waste from industrial and other establishments may be disposed of in an efficient manner with minimum cost for plant outlay and for plant maintenance and without contamination of streams.

The invention is particularly applicable to the disposal of brewery wastes, but it may also be used in the treatment of other waste substances wherein the waste is of an organic nature. In the operation of breweries and distilleries, there is necessarily produced from the grains a waste product commonly termed "brewer's slop". These grains remain as a residue after the fermentation process and the extraction of the alcoholic content. The usual practice in the treatment of this waste is to subject the grains, which carry a considerable quantity of water, to a screening or pressing or centrifuging operation to remove as much of the water as is possible. After as much water has been removed in this way as is practicable, the waste grains are finally placed in a dryer for the removal of the remaining moisture.

When the water is pressed or screened or centrifuged from the waste, there is a certain amount of solids of an organic character which ferment quite freely. Under the laws of many states, this water may not be run into sewers or into streams, and the disposition of it has represented a complete loss. One method of disposing of this waste water is by multi-effect evaporators. Such a plant represents very heavy initial investment, together with considerable maintenance and operating expenses. Another method for the purification of this water has been to discharge it into septic tanks where it is purified by natural processes.

In the operation of commercial breweries, it is the practice to take the waste grains after the extraction of the water therefrom by the screening, pressing, or centrifuging operation and to dry them and to dispose of them for cattle food. The drying of the pressed grains has to be done under conditions such that the grain will not be scorched or contaminated with furnace gases, as otherwise cattle will not eat it. In the present day modern plants for the treatment of these waste grains, steam drying apparatus is used. Such equipment requires, in addition to the drying tables and the attendant equipment, a boiler of sufficient capacity to generate steam for operating the drying tables. There is considerable investment and operating cost involved in the installation and continued operation of such a plant.

According to the present invention, I provide a plant for the treatment of waste materials wherein an initial separation is made between the bulk of the liquid and the bulk of the solids. This may be done by screening, pressing, or centrifuging as heretofore practiced. The waste of the liquid is discharged into the septic tanks, while the waste solids are delivered to a dryer, preferably of the direct fired rotary kiln type, such as shown for instance in my patents, No. 1,332,380, dated March 2, 1920, and No. 1,510,307, dated September 30, 1924. This dryer is fired from gas burners.

In the operation of the septic tanks, a considerable volume of methane gas is generated, and I have discovered that, in the operation of breweries as at present conducted, the amount of solids and decomposable substance in the waste water is just about sufficient to generate a volume of gas of a B. t. u. value required to substantially completely dry all of the grains in a direct heat dryer of this type. According to the present method of burning the gases produced in the septic tanks in the dryers for drying the grains, the grains can be economically dried. The gases of combustion are free of impurities which would contaminate the grains, and the temperature and conditions of operation can be regulated to prevent scorching. The rate of gas production from the septic tanks may vary. When the amount of gases is insufficient, additional heat may be supplied from other sources, or the operation of the plant may be modified to pass more organic material into septic tanks to increase to the necessary extent the rate of gas production.

The invention may be readily understood by reference to the accompanying drawing which is purely a schematic diagram of a plant layout embodying the present invention and for carrying out the method of the present invention. In the explanation of the drawing, I shall describe the plant with particular reference to the treatment of brewery waste, but it will be understood that this is by way of illustration and that the invention is also applicable to the treatment of other wastes in the nature of sludges composed of solid organic material and water.

In the drawing, 2 designates a source of supply for a sludge, such as brewer's slop. This source of supply discharges into a unit 3, which effects the major separation of the bulk of the liquid from the bulk of the solids. In may be in the nature of a press, as indicated in the drawing, or it may be a screening or centrifuging plant. From the press, the solids are discharged along the line 4 into a direct heated drying unit 5. This drying unit is preferably of the rotary kiln type, as is disclosed in my said patent, above referred to, wherein the gases are first burned out of contact with the material to be dried and most of the heat extracted therefrom, the gases then being passed directly through the material being dried, the material being agitated continuously throughout the period of drying. From the dryer, the dried solid matter, which in the case of brewery waste comprises grains for cattle food, is discharged as indicated by the line 6. It may be discharged into conveyors, storage bins, trucks, or other means for its final disposition.

The liquid phase of the sludge which is discharged from the pressing or extracting unit 3 is carried through a conduit designated by the line 7 into a septic tank or series of septic tanks, such as are commonly provided in sewerage and other waste disposal plants, and which in the drawing is designated by the reference numeral 8. The septic tank, or series of septic tanks, as the case may be, are so arranged that the gases generated through the operation of the septic tanks can be conducted through a conduit 9 to a burner diagrammatically indicated at 10, this gas burner 10 being arranged to heat the dryer, as will be understood by those skilled in the art.

In the drawing, I have indicated an air supply line 11, leading to the burner. Where the volume or heating value of the gases generated may be insufficient to completely dry the grains, it is contemplated that additional heat be supplied to the dryer, preferably through preheating the air to the burner 11. For the purpose of supplying such additional heat units, I have diagrammatically shown an air heater 12. This heater is indicated as being of the character wherein the air is passed over a steam coil. The steam for supplying the air heater may be the exhaust from a steam engine, or from other equipment in the brewery, and additional boiler capacity is not necessarily required for the operation of the air heater.

The invention contemplates that the major portion of the heat shall be furnished from the gas generated in the septic tanks and that the heater 12 shall merely make up such deficiency as may be necessary at those times and in the event that the septic tank shall not supply a sufficient quantity of gas to effect drying to the desired extent.

In addition to supplying additional heat units from an air heater, or from any other source, it is contemplated that additional heat units can be supplied by increasing the volume of gas generated in the septic tanks by wasting a greater percentage of the solid material into the septic tanks. For instance, where there is insufficient organic matter in the water being discharged into the septic tank, some of the solids may be diverted from the dryer into the septic tank, either in advance or following the extracting unit 3. In the drawing, the dotted line 13 indicates the intermittent or optional bypassing of an additional amount of solids to the septic tank.

The method and apparatus described provides an extremely economical system for the disposal of waste sludges of an organic nature. The separating unit 3 is of the type commonly employed in plants of this nature and is the equipment that has to be provided in any kind of a disposal plant. In any kind of a system some such separating unit has to be employed for economical reasons. The septic tank for the purification of the liquid is cheaper to operate and to install than multi-effect evaporators. The water which discharges from the septic tanks is clean and generally unobjectionable. The gas, which has heretofore been considered a more or less undesirable by-product, is effectively used as the principal source of heat units for drying the solid phase of the sludge. It provides a clean, odorless, easily controlled source of heat. The gas used may be burned the same as any combustible gas, either artificial or natural, and the burners can be controlled by thermostats, as will be well understood by those skilled in the art. The fact that the volume of the decomposable solids and substances going into the septic tank will generate sufficient heat to take care of the major portion of the drying of the solids enables the system to be operated at a very low cost. Where additional heat is required, this is conveniently done by preheating the air for combustion in the dryer, and, as above stated, the heat can be derived from a waste source of heat, rather than requiring additional boiler or heating capacity. Also, by controlling the extent of separation of liquids in solids, or by returning some of the solids to the liquid to go into the septic tanks with the liquid, the volume of gas generated can be more or less accurately regulated to meet within rather close limits the requirements of the dryer. The direct heat dryer itself offers considerably more economy from the standpoint of initial installation and from the standpoint of operating costs than does a steam drying installation with its attendant boiler.

As previously stated, while the invention is especially applicable to the treatment of brewers and distillers slop, it may be advantageously used in the treatment of other sludges of an organic nature. Moreover, while I have indicated in the accompanying sketch a press as the means for effecting the separation between the bulk of the liquid and the bulk of the solid, in the final separating step, it will be understood that any other separating unit, as a screening unit or a centrifuge, may be substituted and used with equal advantage. The term "septic tank" as herein used means any disposal system of the type wherein there is an anaerobic action and the generation of methane gas.

I claim as my invention:

1. The method of treating organic waste sludges which comprises initially separating the bulk of the liquid from the bulk of the solids, transferring the solids after initial removal of the water to a dryer, transferring the liquid phase of the sludge with solid particles therein to a septic tank, and utilizing gases generated in the septic tank for operation of the dryer.

2. The method for the treatment of organic sludges which comprises initially separating the bulk of the solids from the bulk of the liquids, discharging the solids into a dryer, discharging the liquid into a septic tank, utilizing the gases generated in the septic tank as the major source of heat for the dryer, and varying the amount of solids discharged with the liquid into the septic tank to vary the amount of gas generated.

3. The method for the treatment of organic sludges which comprises initially separating the bulk of the solids from the bulk of the liquids, discharging the solids into a dryer, discharging the liquid into a septic tank, utilizing the gases generated in the septic tank as the major source of heat for the dryer, and supplying any deficiency of heat to the dryer from an auxiliary heating unit.

4. The method for the treatment of organic sludges which comprises initially separating the bulk of the solids from the bulk of the liquids, discharging the solids into a dryer, discharging the liquid into a septic tank, utilizing the gases generated in the septic tank as the major source of heat for the dryer, and making up any deficiency in the heating capacity of the gas by preheating the air combustion for burning the gas.

5. The method of treating organic waste sludges which comprises initially separating the bulk of the liquids from the bulk of the solids, discharging the bulk of the solids into a dryer, discharging the bulk of the liquid into a septic tank, regulating the volume of solids which are carried by the liquid into the septic tank to vary the amount of gas generated in the septic tank, utilizing the gas generated in the septic tank as a source of heat for the dryer, and providing additional heat units when the gas is deficient from an auxiliary source of heat.

LINDSAY R. CHRISTIE.